US012104525B2

United States Patent
Suzuki et al.

(10) Patent No.: US 12,104,525 B2
(45) Date of Patent: Oct. 1, 2024

(54) OPPOSED-PISTON ENGINE

(71) Applicant: MITSUBISHI HEAVY INDUSTRIES, LTD., Tokyo (JP)

(72) Inventors: Keita Suzuki, Tokyo (JP); Yuki Koshiba, Tokyo (JP); Kengo Tanaka, Tokyo (JP); Shintaro Shuto, Tokyo (JP); Masafumi Mori, Tokyo (JP); Shigetoshi Sugata, Tokyo (JP); Takashi Ueda, Akashi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/278,754

(22) PCT Filed: Mar. 22, 2022

(86) PCT No.: PCT/JP2022/012971
§ 371 (c)(1),
(2) Date: Aug. 24, 2023

(87) PCT Pub. No.: WO2022/202746
PCT Pub. Date: Sep. 29, 2022

(65) Prior Publication Data
US 2023/0392544 A1 Dec. 7, 2023

(30) Foreign Application Priority Data
Mar. 26, 2021 (JP) .................. 2021-053560

(51) Int. Cl.
*F02B 75/28* (2006.01)
*F02B 25/08* (2006.01)
*F02M 61/14* (2006.01)

(52) U.S. Cl.
CPC .............. *F02B 75/28* (2013.01); *F02B 25/08* (2013.01); *F02M 61/14* (2013.01)

(58) Field of Classification Search
CPC .......... F02B 75/28; F02B 25/08; F02M 61/14
See application file for complete search history.

(56) References Cited

U.S. PATENT DOCUMENTS

| 9,631,549 B2 | 4/2017 | Abani et al. |
| 2013/0036999 A1* | 2/2013 | Levy ..................... F02B 75/243 |
| | | 123/294 |
| 2023/0014414 A1 | 1/2023 | Mori et al. |

FOREIGN PATENT DOCUMENTS

| JP | 2-215957 A | 8/1990 |
| JP | 2007-107475 A | 4/2007 |

(Continued)

OTHER PUBLICATIONS

International Preliminary Report on Patentability and Written Opinion of the International Searching Authority for International Application No. PCT/JP2022/012971, dated Oct. 5, 2023, with an English translation.

(Continued)

*Primary Examiner* — Kevin A Lathers
(74) *Attorney, Agent, or Firm* — Birch, Stewart, Kolasch & Birch, LLP (57) ABSTRACT

An opposed-piston engine includes: a cylinder; a one-side piston disposed inside the cylinder on one side in an axial direction; and an other-side piston disposed inside the cylinder on another side in the axial direction. A top surface of the one-side piston has a one-side cavity recessed in a central portion. A top surface of the other-side piston has an other-side cavity recessed in a central portion. An outer peripheral edge of the one-side cavity is at least 0.1D1 away from an outer peripheral edge of the top surface of the one-side piston over the entire circumference, where D1 is a diameter of the top surface of the one-side piston. An outer peripheral edge of the other-side cavity is at least 0.1D2 away from an outer peripheral edge of the top surface of the (Continued)

other-side piston over the entire circumference, where D2 is a diameter of the top surface of the other-side piston.

8 Claims, 9 Drawing Sheets

(56) References Cited

FOREIGN PATENT DOCUMENTS

| JP | 2013-83271 A | 5/2013 |
|----|--------------|--------|
| JP | 2013-525684 A | 6/2013 |
| JP | 2013-534295 A | 9/2013 |
| JP | 2021-120541 A | 8/2021 |
| WO | WO 2011/139332 A2 | 11/2011 |
| WO | WO 2012/023975 A1 | 2/2012 |

OTHER PUBLICATIONS

International Search Report for International Application No. PCT/JP2022/012971, dated Jun. 7, 2022.

* cited by examiner

OPPOSED-PISTON ENGINE

TECHNICAL FIELD

The present disclosure relates to an opposed-piston engine.

The present application claims priority based on Japanese Patent Application No. 2021-053560 filed on Mar. 26, 2021, the entire content of which is incorporated herein by reference.

BACKGROUND ART

Two-stroke diesel engines include opposed-piston engines, in which two pistons are placed opposite each other inside one cylinder, forming a combustion chamber between the two pistons (for example, Patent Document 1). In an opposed-piston engine, during one reciprocating motion of the piston, combustion gas in the cylinder is discharged through an exhaust port formed on the cylinder wall in the exhaust process, and air is taken into the cylinder through a scavenging port formed on the cylinder wall in the scavenging process. The scavenging port formed on the cylinder wall may be inclined to form a swirl flow (swirl) of the air taken in through the scavenging port, which enhances the effect of scavenging and exhaust air replacement.

Patent document 1 discloses an invention that aims to suppress interference of the spray from the injector and minimize heat transfer to the piston and cylinder wall by employing a spiral injection structure in the injection holes for injecting fuel into the cylinder.

CITATION LIST

Patent Literature

Patent Document 1: U.S. Pat. No. 9,631,549B

SUMMARY

Problems to be Solved

In an opposed-piston engine, fuel is injected from a fuel injection device disposed on the cylinder surface. The fuel injected into the cylinder may flow along the swirl flow formed in the cylinder and burn in an outer peripheral region of the combustion chamber. The spread of the combustion flame to the outer peripheral region of the combustion chamber may increase the heat load on an outer peripheral portion of the piston, which is difficult to cool from the inside of the piston. The increased heat load on the outer peripheral portion of the piston may cause problems such as piston sliding failure due to deterioration in piston lubrication (degradation of lubricant oil) and piston damage due to thermal stresses on the piston.

In the piston described in Patent Document 1, the distance from the outer peripheral edge of the cavity formed on the top surface of the piston to the outer peripheral edge of the top surface is short, and the heat from the combustion flame in the cavity easily reaches the outer peripheral portion of the piston, which may increase the heat load on the piston outer peripheral portion.

In view of the above, an object of at least one embodiment of the present disclosure is to provide an opposed-piston engine that can reduce the heat load on the piston outer peripheral portion.

Solution to the Problems

An opposed-piston engine according to an embodiment of the present disclosure includes: a cylinder; a one-side piston disposed inside the cylinder on one side in an axial direction; and an other-side piston disposed inside the cylinder on another side in the axial direction. A top surface of the one-side piston has a one-side cavity recessed in a central portion. A top surface of the other-side piston has an other-side cavity recessed in a central portion. An outer peripheral edge of the one-side cavity is at least 0.1D1 away from an outer peripheral edge of the top surface of the one-side piston over the entire circumference, where D1 is a diameter of the top surface of the one-side piston. An outer peripheral edge of the other-side cavity is at least 0.1D2 away from an outer peripheral edge of the top surface of the other-side piston over the entire circumference, where D2 is a diameter of the top surface of the other-side piston.

Advantageous Effects

At least one embodiment of the present disclosure provides an opposed-piston engine that can reduce the heat load on the piston outer peripheral portion.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Opposed-Piston Engine)

Figure 1:
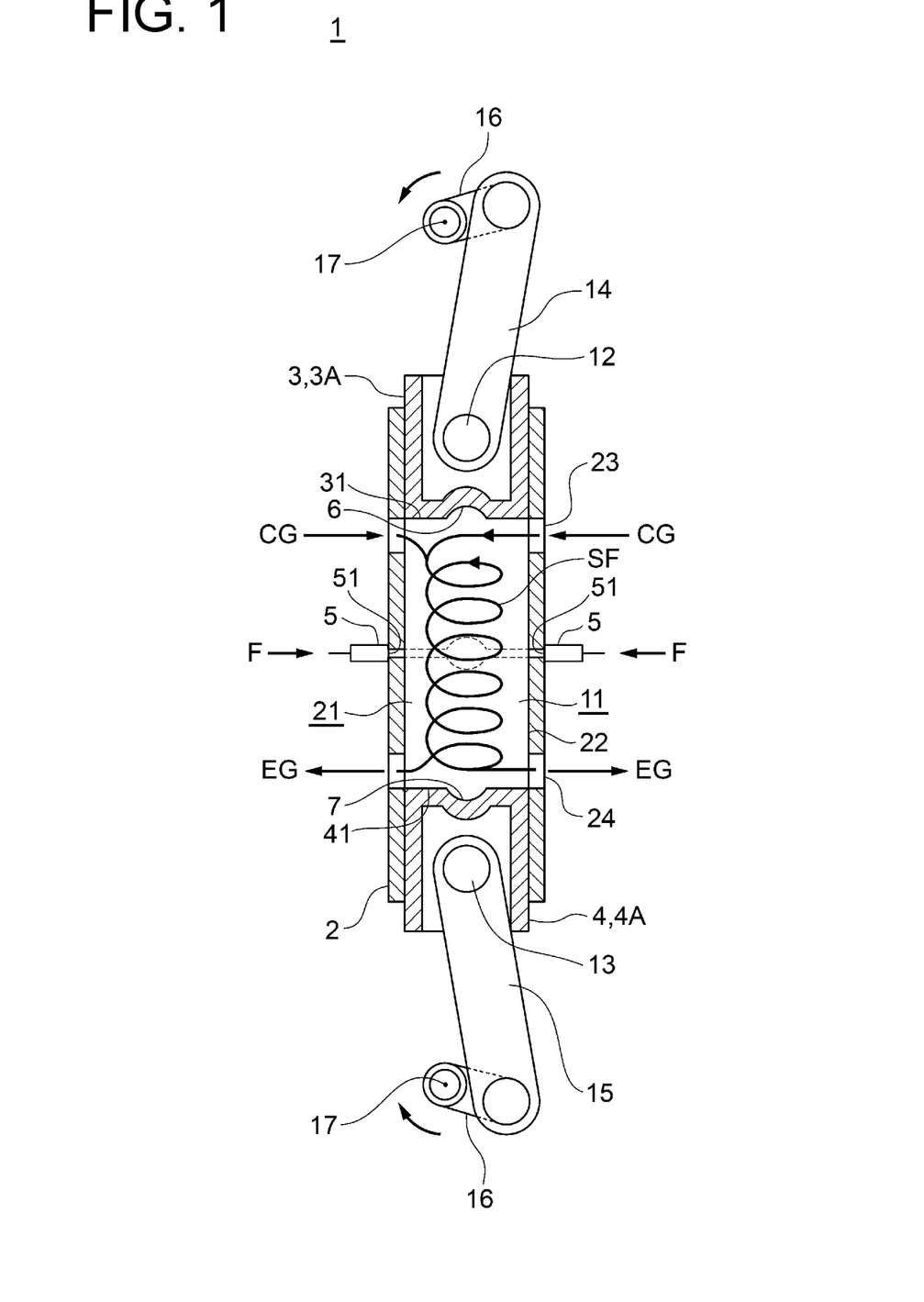
FIG. 1 is a schematic cross-sectional view schematically showing the configuration of an opposed-piston engine according to an embodiment of the present disclosure.

FIG. 1 is a schematic cross-sectional view schematically showing the configuration of an opposed-piston engine according to an embodiment of the present disclosure. As shown in FIG. 1, an opposed-piston engine 1 according to some embodiments includes a cylinder 2 having a cylinder bore 21 extending along the axial direction (upper-lower direction in the figure) inside, a one-side piston 3 disposed inside the cylinder 2 on one side (upper side in the figure) in the axial direction, and an other-side piston 4 disposed inside the cylinder 2 on the other side (lower side in the figure) in the axial direction. The other-side piston 4 is disposed opposite to the one-side piston 3 in the axial direction of the cylinder 2.

The cylinder 2 has an inner surface 22 with a cylinder bore 21. At least one (in the illustrated example, a plurality of) scavenging port 23 is formed on the inner surface 22 of the cylinder 2 on one side in the axial direction. At least one (in the illustrated example, a plurality of) exhaust port 24 is formed on the inner surface 22 of the cylinder 2 on the other side in the axial direction. The scavenging ports 23 are arranged at intervals in the circumferential direction of the cylinder 2. The exhaust ports 24 are arranged at intervals in the circumferential direction of the cylinder 2.

Each of the scavenging ports 23 is shaped to introduce combustion gas CG (compressed air in the illustrated example) from the outside to the inside of the cylinder 2 in a direction inclined to one side in the circumferential direction with respect to the radial direction of the cylinder 2. In an embodiment, each of the scavenging ports 23 extends in a direction inclined at a predetermined angle to one side in the circumferential direction with respect to the radial direction of the cylinder 2. The combustion gas CG (scavenging gas) introduced into the cylinder 2 (i.e., cylinder bore 21) through the scavenging port 23 forms a swirl flow SF (swirl) inside the cylinder 2. Thereby, the combustion gas CG introduced into the cylinder 2 through the scavenging port 23 flows to the exhaust side while swirling. By forming the swirl flow SF inside the cylinder 2, in the scavenging process and the exhaust process, it is possible to enhance the effect of scavenging and exhaust gas replacement in the cylinder bore 21.

In the illustrated embodiment, the one-side piston 3 is disposed on the scavenging side where the scavenging port 23 is formed in the axial direction of the cylinder 2. The other-side piston 4 is disposed on the exhaust side where the exhaust port 24 is formed in the axial direction of the cylinder 2. That is, the one-side piston 3 is composed of a scavenging-side piston 3A, and the other-side piston 4 is composed of an exhaust-side piston 4A. Hereinafter, unless otherwise mentioned, the one-side piston 3 may be the scavenging-side piston 3A or the exhaust-side piston 4A. The other-side piston 4 may be the exhaust-side piston 4A or the scavenging-side piston 3A.

Each of the one-side piston 3 and the other-side piston 4 is arranged in the cylinder bore 21 to reciprocate along the axial direction of the cylinder 2. A combustion chamber 11 is formed between the top surface 31 of the one-side piston 3 and the top surface 41 of the other-side piston 4 in the cylinder bore 21. In other words, the top surface 31 of the one-side piston 3 faces the top surface 41 of the other-side piston 4 with the combustion chamber 11 interposed therebetween.

In FIG. 1, the one-side piston 3 and the other-side piston 4 at bottom dead center are indicated by the solid lines, and the top surface 31 of the one-side piston 3 and the top surface 41 of the other-side piston 4 at top dead center are indicated by the dashed-two dotted lines.

The one-side piston 3 and the other-side piston 4 reciprocate inside the cylinder 2 in synchronization with each other. In the illustrated embodiment, the one-side piston 3 reaches top dead center (the position closest to the other-side piston 4) when the other-side piston 4 reaches top dead center (the position closest to the one-side piston 3). Further, the one-side piston 3 reaches bottom dead center (the position farthest from the other-side piston 4) when the other-side piston 4 reaches bottom dead center (the position farthest from the one-side piston 3). The one-side piston 3 and the other-side piston 4 may reach top dead center and bottom dead center at different times.

In the illustrated embodiment, as shown in FIG. 1, the one-side piston 3 is connected to one end of a one-side connecting rod 14 via a one-side piston pin 12, and the other end of the one-side connecting rod 14 is connected to a crankshaft 16. Similarly, the other-side piston 4 is connected to one end of an other-side connecting rod 15 via an other-side piston pin 13, and the other end of the other-side connecting rod 15 is connected to the crankshaft 16. As the crankshaft 16 rotates around a rotational shaft 17, the one-side piston 3 and the other-side piston 4 synchronize with each other and reciprocate inside the cylinder 2 so that their sliding directions are opposite each other in the axial direction of the cylinder 2.

As shown in FIG. 1, the opposed-piston engine 1 includes at least one fuel injection device (fuel injection valve) 5 configured to inject fuel between the one-side piston 3 and the other-side piston 4 inside the cylinder 2.

The fuel injection device 5 is disposed on the inner surface 22 of the cylinder 2. The fuel injection device 5 has at least one injection hole 51 for injecting fuel F into the cylinder bore 21. The fuel injection device 5 injects fuel into the cylinder bore 21 when the crank angle (the angle of rotation of the crankshaft 16) reaches a predetermined angle (for example, when the one-side piston 3 or the other-side piston 4 reaches top dead center).

The opposed-piston engine 1 compresses and heats the combustion gas CG introduced into the cylinder 2 through the scavenging port 23 by the one-side piston 3 and the other-side piston 4 to a temperature higher than the ignition point of the fuel F. By injecting the fuel F from the fuel injection device 5 to the compressed and heated combustion gas CG, the fuel F is self-ignited. The self-ignition of the fuel F forms a combustion flame. Due to the expansion of the combustion gas caused by the self-ignition, the one-side piston 3 and the other-side piston 4 are pushed away from each other. Further, the reciprocating motion of the one-side piston 3 and the other-side piston 4 is transmitted to the crankshaft 16 and converted into rotational force (power) by the crankshaft 16.

Each of the scavenging ports 23 is formed on the scavenging side (the one side in the axial direction) of the top surface 31 of the scavenging-side piston 3A at top dead center and on the exhaust side (the other side in the axial direction) of the top surface 31 of the scavenging-side piston 3A at bottom dead center. Each of the exhaust ports 24 is formed on the exhaust side of the top surface 41 of the exhaust-side piston 4A at top dead center and on the scavenging side of the top surface 41 of the exhaust-side piston 4A at bottom dead center.

By sliding the top surface 31 of the scavenging-side piston 3A to the scavenging side over each scavenging port 23, the combustion gas CG can be supplied to the cylinder bore 21 through each scavenging port 23. By sliding the top surface 41 of the exhaust-side piston 4A to the exhaust side over each exhaust port 24, the exhaust gas EG can be discharged from the cylinder bore 21 through each exhaust port 24. Since the combustion gas CG supplied to the cylinder bore 21 is compressed by a turbocharger (not shown), the pressure difference between the scavenging port 23 and the exhaust port 24 causes the supply of combustion gas CG to the cylinder bore 21 and the discharge of exhaust gas EG from the cylinder bore 21.

Figure 2:
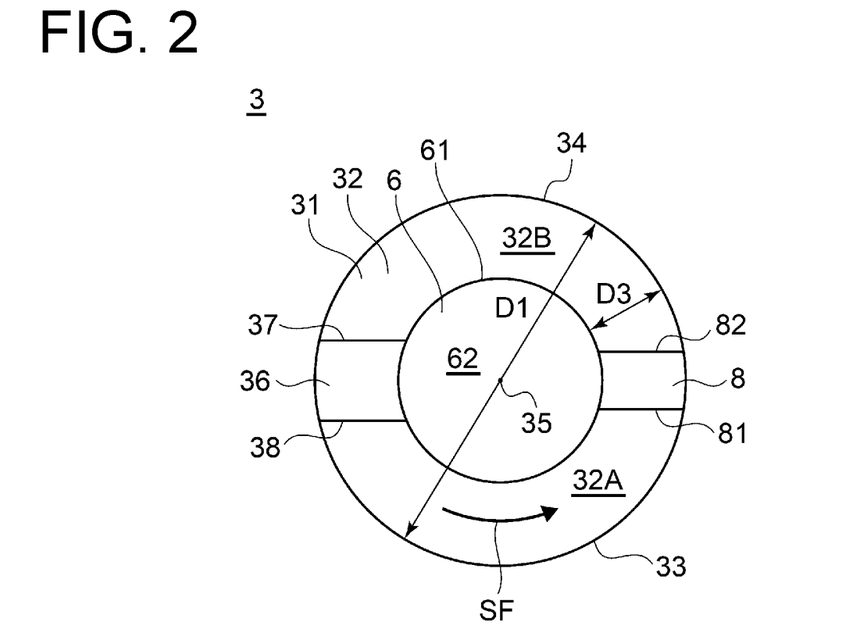
FIG. 2 is a schematic front view of a one-side piston when the top surface of the one-sided piston in an embodiment of the present disclosure is viewed from the front.
Figure 3:
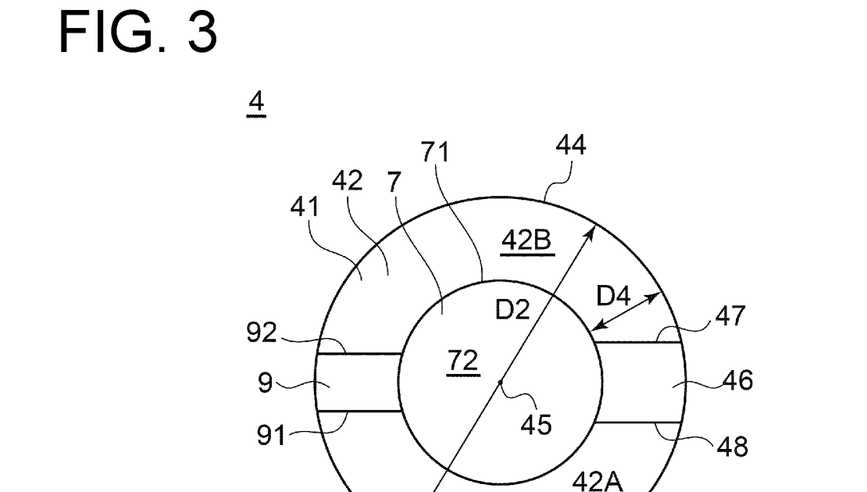
FIG. 3 is a schematic front view of an other-side piston when the top surface of the other-sided piston in an embodiment of the present disclosure is viewed from the front.
Figure 4:
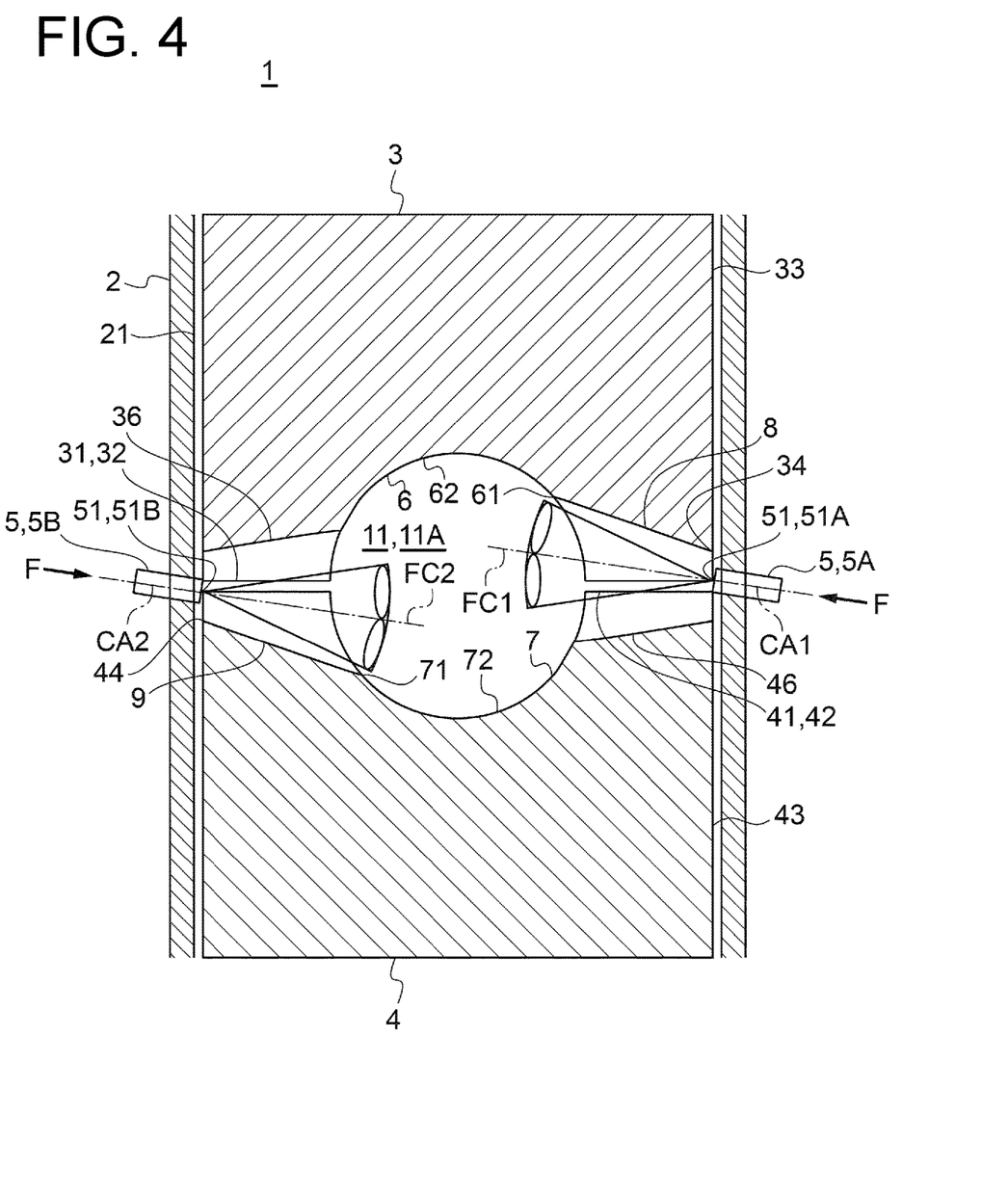
FIG. 4 is a schematic cross-sectional view schematically showing a cross-section along the axial direction in the vicinity of a combustion chamber of an opposed-piston engine according to an embodiment of the present disclosure.

FIG. 2 is a schematic front view of a one-side piston when the top surface of the one-sided piston in an embodiment of the present disclosure is viewed from the front. FIG. 3 is a schematic front view of an other-side piston when the top surface of the other-sided piston in an embodiment of the present disclosure is viewed from the front. FIG. 4 is a schematic cross-sectional view schematically showing a cross-section along the axial direction in the vicinity of a combustion chamber of an opposed-piston engine according to an embodiment of the present disclosure.

As shown in FIG. 4, the opposed-piston engine 1 according to some embodiments includes the above-described cylinder 2, the above-described one-side piston 3 having the one-side cavity 6, and the above-described other-side piston 4 having the other-side cavity 7. The top surface 31 of the one-side piston 3 has a one-side cavity 6 recessed in a central portion. The top surface 41 of the other-side piston 4 has an other-side cavity 7 recessed in a central portion. The other-side cavity 7 faces the one-side cavity 6 with the combustion chamber 11 interposed therebetween.

In the illustrated embodiment, as shown in FIG. 2, the top surface 31 of the one-side piston 3 includes a one-side outer peripheral edge portion 32 extending from the outer peripheral edge 61 of the one-side cavity 6 toward the outer peripheral side (the outer side in the radial direction of the cylinder 2). The outer peripheral edge 34 of the one-side outer peripheral edge portion 32 (top surface 31) is connected to one end of an outer peripheral portion 33 of the one-side piston 3 extending along the axial direction of the cylinder 2. The one-side cavity 6 has a concave curved surface 62 whose depth from the outer peripheral edge 61 increases from the outer peripheral edge 61 toward the inner side in the radial direction of the cylinder 2.

As shown in FIG. 2, the diameter of the top surface 31 of the one-side piston 3 is defined as D1, and the distance (radial length) from the outer peripheral edge 61 of the one-side cavity 6 to the outer peripheral edge 34 of the top surface 31 of the one-side piston 3 is defined as D3. The top surface 31 of the one-side piston 3 satisfies the condition of D3>0.1D1 over the entire circumference. In other words, the outer peripheral edge 61 of the one-side cavity 6 is at least 0.1D1 away from the outer peripheral edge 34 of the top surface 31 of the one-side piston 3 over the entire circumference.

In the illustrated embodiment, as shown in FIG. 3, the top surface 41 of the other-side piston 4 includes an other-side outer peripheral edge portion 42 extending from the outer peripheral edge 71 of the other-side cavity 7 toward the outer peripheral side (the outer side in the radial direction of the cylinder 2). The outer peripheral edge 44 of the other-side outer peripheral edge portion 42 (top surface 41) is connected to one end of an outer peripheral portion 43 of the other-side piston 4 extending along the axial direction of the cylinder 2. The other-side cavity 7 has a concave curved surface 72 whose depth from the outer peripheral edge 71 increases from the outer peripheral edge 71 toward the inner side in the radial direction of the cylinder 2.

As shown in FIG. 3, the diameter of the top surface 41 of the other-side piston 4 is defined as D2, and the distance (radial length) from the outer peripheral edge 71 of the other-side cavity 7 to the outer peripheral edge 44 of the top surface 41 of the other-side piston 4 is defined as D4. The top surface 41 of the other-side piston 4 satisfies the condition of D4>0.1D2 over the entire circumference. In other words, the outer peripheral edge 71 of the other-side cavity 7 is at least 0.1D2 away from the outer peripheral edge 44 of the top surface 41 of the other-side piston 4 over the entire circumference.

According to the above configuration, the outer peripheral edge 61 of the one-side cavity 6 is at least a predetermined distance (0.1D1) away from the outer peripheral edge 34 of the top surface 31 of the one-side piston 3 over the entire circumference, and the outer peripheral edge 71 of the other-side cavity 7 is at least a predetermined distance (0.1D2) away from the outer peripheral edge 44 of the top surface 41 of the other-side piston 4 over the entire circumference. Accordingly, a combustion space (cavity forming space) 11A is formed at the center of the combustion chamber 11 by the one-side cavity 6 and the other-side cavity 7. Combustion can be completed in the combustion space 11A by compressing the combustion gas in the combustion space 11A and injecting fuel into the combustion space 11A. As a result, the combustion flame is suppressed from reaching the outer peripheral portions 33, 43 of the one-side piston 3 and the other-side piston 4, thereby reducing the heat load on the outer peripheral portions 33, 43 of the one-side piston 3 and the other-side piston 4.

To further reduce the heat load on the outer peripheral portions 33, 43, the top surface 31 of the one-side piston 3 preferably satisfies the condition D3>0.2D1 over the entire circumference, further preferably D3>0.3D1 over the entire circumference. Additionally, to further reduce the heat load on the outer peripheral portions 33, 43, the top surface 41 of the other-side piston 4 preferably satisfies the condition D4>0.2D2 over the entire circumference, further preferably D4>0.3D2 over the entire circumference.

In some embodiments, as shown in FIG. 4, the one-side cavity 6 and the other-side cavity 7 are hemispherical. When the one-side cavity 6 and the other-side cavity 7 are hemispherical, while securing the volume of the spherical combustion space 11A formed at the center of the combustion chamber 11, the distances D3, D4 of the outer peripheral edges 61, 71 of the one-side cavity 6 and the other-side cavity 7 from the outer peripheral edges 34, 44 of the top surface of the one-side piston 3 and the other-side piston 4 can be increased. By increasing the distances D3, D4, the heat load on the outer peripheral portions 33, 43 of the one-side piston 3 and the other-side piston 4 can be reduced effectively.

(One-Side Fuel Injection Device and Other-Side Fuel Injection Device)

In some embodiments, as shown in FIGS. 2 and 4, the one-side piston 3 has a one-side fuel injection groove 8 extending from the outer peripheral edge 61 of the one-side cavity 6 to the outer peripheral edge 34 of the top surface 31 of the one-side piston 3. As shown in FIGS. 3 and 4, the other-side piston 4 has an other-side fuel injection groove 9 extending from the outer peripheral edge 71 of the other-side cavity 7 to the outer peripheral edge 44 of the top surface 41 of the other-side piston 4. As shown in FIG. 4, the one-side fuel injection groove 8 and the other-side fuel injection groove 9 may be formed such that their groove depth increases toward the inner side in the radial direction. The at least one fuel injection device 5 includes a one-side fuel injection device 5A disposed so that injected fuel passes through the one-side fuel injection groove 8, and an other-side fuel injection device 5B disposed so that injected fuel passes through the other-side fuel injection groove 9.

Figure 5:
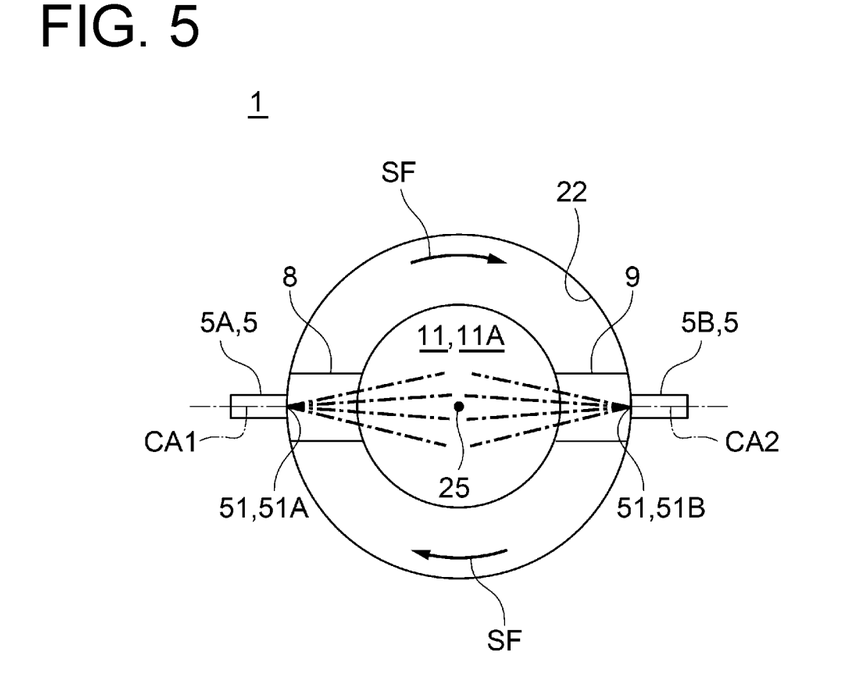
FIG. 5 is an explanatory diagram for describing a positional relationship between a one-side fuel injection groove, an other-side fuel injection groove, a one-side fuel injection device, and an other-side fuel injection device.

FIG. 5 is an explanatory diagram for describing a positional relationship between a one-side fuel injection groove, an other-side fuel injection groove, a one-side fuel injection device, and an other-side fuel injection device. In the embodiment shown in FIG. 5, the one-side fuel injection device 5A is disposed so that the injection hole 51A (51) is located within a range where the one-side fuel injection groove 8 is formed in the circumferential direction of the cylinder 2. Further, the one-side fuel injection device 5A is disposed so that the straight line extending the central axis CA1 passes through the one-side fuel injection groove 8. The other-side fuel injection device 5B is disposed so that the injection hole 51B (51) is located within a range where the other-side fuel injection groove 9 is formed in the circumferential direction of the cylinder 2. Further, the other-side fuel injection device 5B is disposed so that the straight line extending the central axis CA2 passes through the other-side fuel injection groove 9.

According to the above configuration, the fuel injected by the one-side fuel injection device 5A passes through the one-side fuel injection groove 8 and is supplied to the combustion space 11A. Further, the fuel injected by the other-side fuel injection device 5B passes through the other-side fuel injection groove 9 and is supplied to the combustion space 11A. Since the fuel to be supplied to the combustion space 11A passes through the one-side fuel injection groove 8 and the other-side fuel injection groove 9, the interference of the swirl flow SF can be suppressed. Further, by providing multiple supply systems for supplying fuel to the combustion space 11A, combustion in the combustion space 11A can be promoted, thereby suppressing the increase of unburned loss in the opposed-piston engine 1.

Additionally, according to the above configuration, the fuel can be supplied to the combustion space (cavity forming space) 11A through the one-side fuel injection groove 8 and the other-side fuel injection groove 9. In this case, the gap between the one-side outer peripheral edge portion 32 (top surface 31) and the other-side outer peripheral edge portion 42 (top surface 41) can be made small. By making the gap small, the combustion flame is suppressed from reaching the outer peripheral portions 33, 43 of the one-side piston 3 and the other-side piston 4, thereby further reducing the heat load on the outer peripheral portions 33, 43 of the one-side piston 3 and the other-side piston 4.

In other embodiments, only one of the one-side fuel injection groove 8 or the other-side fuel injection groove 9 may be provided. The fuel injection device 5 includes any one of the one-side fuel injection device 5A or the other-side fuel injection device 5B.

(One-Side Fuel Injection Groove)

Figure 6:
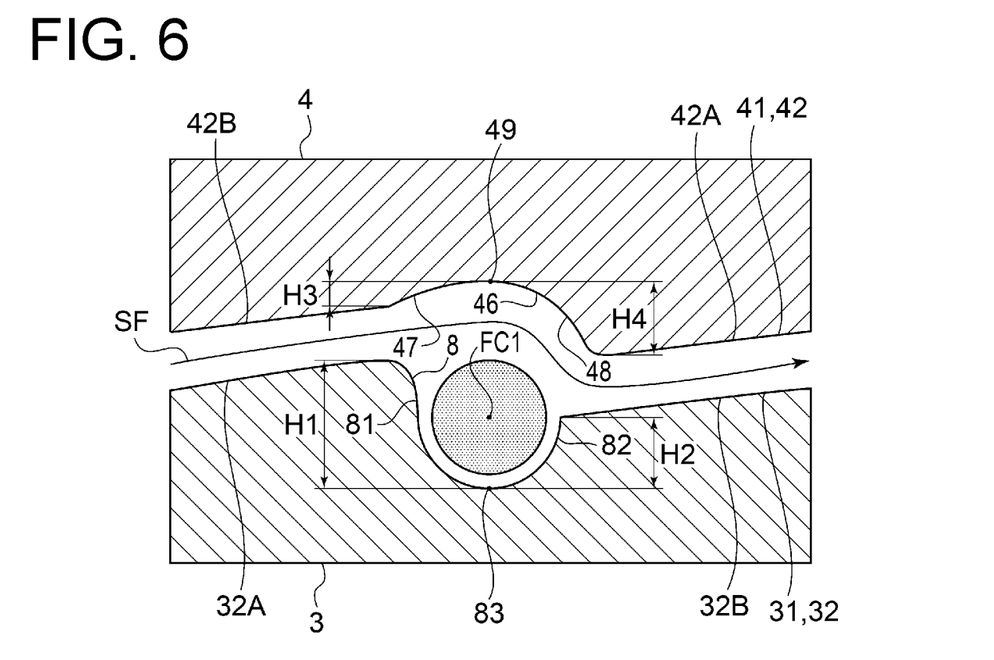
FIG. 6 is an explanatory diagram for describing a one-side fuel injection groove according to an embodiment of the present disclosure.

FIG. 6 is an explanatory diagram for describing a one-side fuel injection groove according to an embodiment of the present disclosure. In some embodiments, as shown in FIG. 6, in the one-side fuel injection groove 8, the groove height H1 of an upstream wall 81 disposed on the upstream side in the flow direction of the swirl flow SF formed inside the cylinder 2 is higher than the groove height H2 of a downstream wall 82 disposed on the downstream side in the flow direction of the swirl flow SF. Hereinafter, the upstream side in the flow direction of the swirl flow SF may simply be referred to as "upstream side", and the downstream side in the flow direction of the swirl flow SF may simply be referred to as "downstream side". The groove heights H1 and H2 refer to heights from a deepest portion 83 of the one-side fuel injection groove 8.

Figure 7:
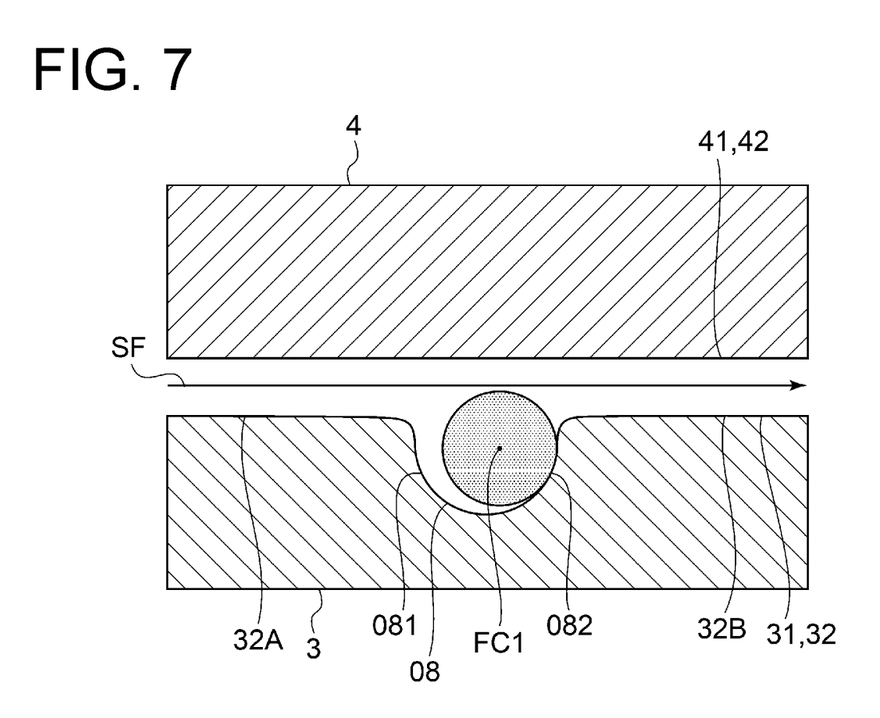
FIG. 7 is an explanatory view for describing a one-side fuel injection groove according to a comparative example.

FIG. 7 is an explanatory view for describing a one-side fuel injection groove according to a comparative example. FC1 in FIGS. 6 and 7 indicates the center of the fuel injected from the one-side fuel injection device 5A. The one-side fuel injection groove 08 according to the comparative example has the same groove height of the upstream wall 081 and the downstream wall 082. In this case, the swirl flow SF may interfere with the fuel passing through the one-side fuel injection groove 08. Specifically, the fuel passing through the one-side fuel injection groove 08 may be flowed downstream by the swirl flow SF and adhere to the wall surface (downstream wall 082) of the one-side piston 3.

In contrast, as shown in FIG. 6, by making the groove height H1 of the upstream wall 81 of the one-side fuel injection groove 8 higher than the groove height H2 of the downstream wall 82, the swirl flow SF can be deflected to avoid entering the one-side fuel injection groove 8. By deflecting the swirl flow SF, the swirl flow SF is prevented from interfering with the fuel passing through the one-side fuel injection groove 8, so that the fuel passing through the one-side fuel injection groove 8 is prevented from flowing along the swirl flow SF and adhering to the wall surface of the one-side piston 3. Thus, the fuel can be supplied to the combustion space 11A without adhering to the wall surface of the one-side piston 3, thereby suppressing the increase of unburned loss in the opposed-piston engine 1.

As shown in FIG. 6, the one-side outer peripheral edge portion 32 (top surface 31) includes a first one-side outer peripheral edge portion 32A extending upstream from the upstream wall 81 and a second one-side outer peripheral edge portion 32B extending downstream from the downstream wall 82. The first one-side outer peripheral edge portion 32A may be inclined so that the height decreases upstream. The second one-side outer peripheral edge portion 32B may be inclined so that the height increases downstream. In this case, the inclined first one-side outer peripheral edge portion 32A and the inclined second one-side outer peripheral edge portion 32B can deflect the swirl flow SF, effectively preventing the swirl flow SF from interfering with the fuel passing through the one-side fuel injection groove 8.

As shown in FIG. 6, the top surface 41 of the other-side piston 4 may have an other-side groove portion 46 recessed at a position facing the one-side fuel injection groove 8 in the cylinder 2. The groove height H3 of an upstream wall 47 of the other-side groove portion 46 is lower than the groove height H4 of a downstream wall 48 of the other-side groove portion 46. The groove heights H3 and H4 refer to heights from a deepest portion 49 of the other-side groove portion 46. In this case, since the other-side groove portion 46 can guide the swirl flow so as to bypass the one-side fuel injection groove 8, the swirl flow SF is effectively prevented from interfering with the fuel passing through the one-side fuel injection groove 8.

(Other-Side Fuel Injection Groove)

Figure 8:
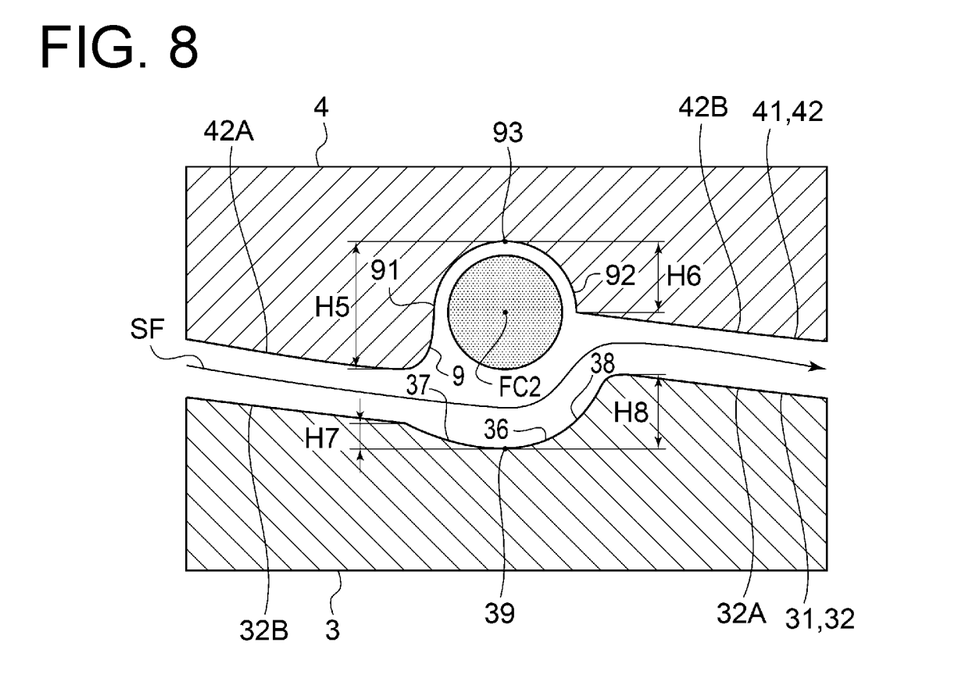
FIG. 8 is an explanatory diagram for describing an other-side fuel injection groove according to an embodiment of the present disclosure.

FIG. 8 is an explanatory diagram for describing an other-side fuel injection groove according to an embodiment of the present disclosure. FC2 in FIG. 8 indicates the center of the fuel injected from the other-side fuel injection device 5B. In some embodiments, as shown in FIG. 8, in the other-side fuel injection groove 9, the groove height H5 of an upstream wall 91 disposed on the upstream side in the flow direction of the swirl flow SF is higher than the groove height H6 of a downstream wall 92 disposed on the downstream side in the flow direction of the swirl flow SF. The groove heights H5 and H6 refer to heights from a deepest portion 93 of the other-side fuel injection groove 9.

According to the above configuration, as shown in FIG. 8, since the groove height H5 of the upstream wall 91 of the other-side fuel injection groove 9 is higher than the groove height H6 of the downstream wall 92, the swirl flow SF can be deflected to avoid entering the other-side fuel injection groove 9. By deflecting the swirl flow SF, the swirl flow SF is prevented from interfering with the fuel passing through the other-side fuel injection groove 9, so that the fuel passing through the other-side fuel injection groove 9 is prevented from flowing along the swirl flow SF and adhering to the wall surface of the other-side piston 4. Thus, the fuel can be supplied to the combustion space 11A without adhering to the wall surface of the other-side piston 4, thereby suppressing the increase of unburned loss in the opposed-piston engine 1.

As shown in FIG. 8, the other-side outer peripheral edge portion 42 (top surface 41) includes a first other-side outer peripheral edge portion 42A extending upstream from the upstream wall 91 and a second other-side outer peripheral edge portion 42B extending downstream from the downstream wall 92. The first other-side outer peripheral edge portion 42A may be inclined so that the height decreases upstream. The second other-side outer peripheral edge portion 42B may be inclined so that the height increases downstream. In this case, the inclined first other-side outer peripheral edge portion 42A and the inclined second other-side outer peripheral edge portion 42B can deflect the swirl flow SF, effectively preventing the swirl flow SF from interfering with the fuel passing through the other-side fuel injection groove 9.

As shown in FIG. 8, the top surface 31 of the one-side piston 3 may have a one-side groove portion 36 recessed at a position facing the other-side fuel injection groove 9 in the cylinder 2. The groove height H7 of an upstream wall 37 of the one-side groove portion 36 is lower than the groove height H8 of a downstream wall 38 of the one-side groove portion 36. The groove heights H7 and H8 refer to heights from a deepest portion 39 of the one-side groove portion 36. In this case, since the one-side groove portion 36 can guide the swirl flow so as to bypass the other-side fuel injection groove 9, the swirl flow SF is effectively prevented from interfering with the fuel passing through the other-side fuel injection groove 9.

In some embodiments, as shown in FIG. 5, the one-side fuel injection groove 8 is offset from the other-side fuel injection groove 9 in the circumferential direction so that they face each other across the axis 25 (the center of a cross-section of the inner surface 22 of the cylinder 2 in the direction perpendicular to the axial direction) of the cylinder 2. In an embodiment, the one-side fuel injection groove 8 is offset from the other-side fuel injection groove 9 within 180°±5° in the circumferential direction of the cylinder 2.

According to the above configuration, the one-side fuel injection groove 8 is offset from the other-side fuel injection groove 9 in the circumferential direction so that they face each other across the axis 25 of the cylinder 2. In this case, the swirl flow SF deflected in the other-side fuel injection groove 9 can be prevented from entering the one-side fuel injection groove 8, and the swirl flow SF deflected in the one-side fuel injection groove 8 can be prevented from entering the other-side fuel injection groove 9. Thus, the fuel can be supplied to the combustion space 11A without adhering to the wall surface of the one-side piston 3 or the other-side piston 4, thereby suppressing the increase of unburned loss in the opposed-piston engine 1.

In some embodiments, as shown in FIG. 4, the central axis CA1 of the one-side fuel injection device 5A is inclined to the one side (the side where the one-side piston 3 is located) in the axial direction from the outer side toward the inner side in the radial direction of the cylinder 2. The central axis CA2 of the other-side fuel injection device 5B is inclined to the other side (the side where the other-side piston 4 is located) in the axial direction from the outer side toward the inner side in the radial direction of the cylinder 2.

The one-side fuel injection device 5A injects fuel into the cylinder bore 21 along the extension direction of the central axis CA1. The other-side fuel injection device 5B injects fuel into the cylinder bore 21 along the extension direction of the central axis CA2. In a cross-section along the axial direction of cylinder 2, the injection direction directed by the injection hole 51A of the one-side fuel injection device 5A may be inclined at an acute angle by a predetermined angle with respect to the extension direction of the central axis CA1. Further, in a cross-section along the axial direction of cylinder 2, the injection direction directed by the injection hole 51B of the other-side fuel injection device 5B may be inclined at an acute angle by a predetermined angle with respect to the extension direction of the central axis CA2. According to the above configuration, the fuel injected from the one-side fuel injection device 5A flows to the one side in the axial direction along the extension direction of the central axis CA1 of the one-side fuel injection device 5A, i.e., to the bottom of the one-side fuel injection groove 8. As a result, in the one-side fuel injection groove 8, it is possible to effectively suppress the interference between the fuel injected from the one-side fuel injection device 5A and the swirl flow SF. Further, the fuel injected from the other-side fuel injection device 5B flows to the other side in the axial direction along the extension direction of the central axis CA2 of the other-side fuel injection device 5B, i.e., to the bottom of the other-side fuel injection groove 9. As a result, in the other-side fuel injection groove 9, it is possible to effectively suppress the interference between the fuel injected from the other-side fuel injection device 5B and the swirl flow SF. Thus, the fuel can be supplied to the combustion space 11A without adhering to the wall surface of the one-side piston 3 or the other-side piston 4, thereby suppressing the increase of unburned loss in the opposed-piston engine 1.

(Scavenging Port)

Figure 9:
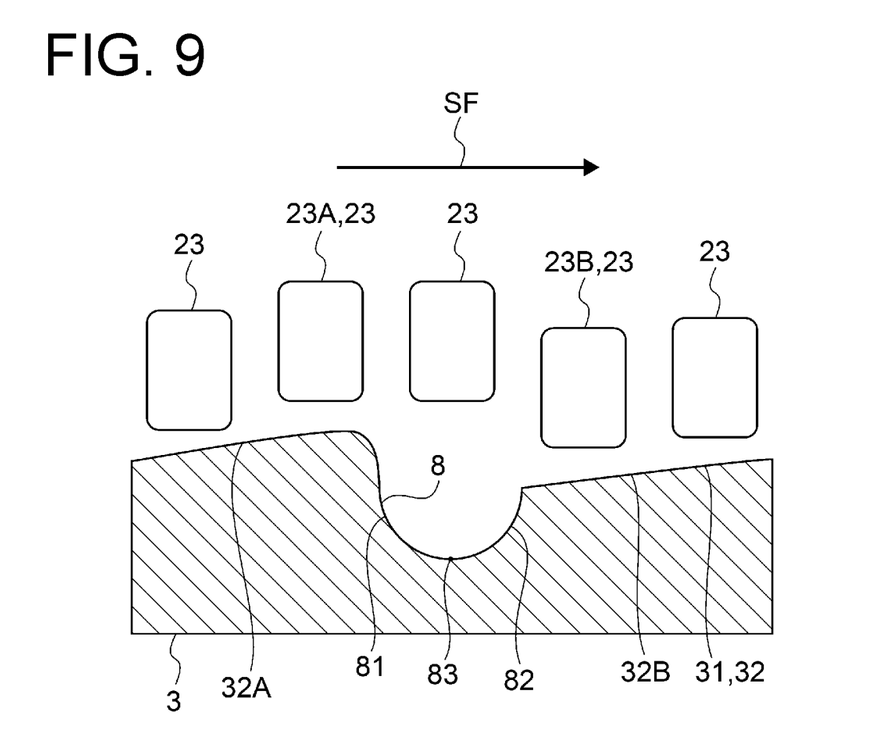
FIG. 9 is an explanatory diagram for describing a scavenging port according to an embodiment of the present disclosure.

FIG. 9 is an explanatory diagram for describing a scavenging port according to an embodiment of the present disclosure. FIG. 9 shows the one-side piston 3 at bottom dead center.

In some embodiments, as shown in FIG. 6, the groove height H1 of the upstream wall 81 of the one-side fuel injection groove 8 is higher than the groove height H2 of the downstream wall 82. As shown in FIG. 9, the inner surface 22 of the cylinder 2 has a first scavenging port 23A formed upstream of the one-side fuel injection groove 8 in the flow direction of the swirl flow SF, and a second scavenging port 23B formed downstream of the one-side fuel injection groove 8 in the flow direction of the swirl flow SF. The first scavenging port 23A is located on the other side (the side where the other-side piston 4 is located) in the axial direction with respect to the second scavenging port 23B. The first scavenging port 23A is the scavenging port 23 closest to the one-side fuel injection groove 8 of the scavenging ports 23 formed upstream of the one-side fuel injection groove 8. The second scavenging port 23B is the scavenging port 23 closest to the one-side fuel injection groove 8 of the scavenging ports 23 formed downstream of the one-side fuel injection groove 8. Each of the scavenging ports 23 is formed at a position offset from at least one of the other scavenging ports 23 in the axial direction of the cylinder 2 so as not to overlap the one-side piston 3 at bottom dead center.

According to the above configuration, the groove height H1 of the upstream wall 81 of the one-side fuel injection groove 8 is higher than the groove height H2 of the downstream wall 82. By forming the first scavenging port 23A, which is formed upstream of the one-side fuel injection groove 8, on the other side in the axial direction with respect to the second scavenging port 23B, which is formed downstream of the one-side fuel injection groove 8, when scavenging the combustion gas, the outer peripheral portion of the scavenging-side piston 3A does not overlap the first scavenging port 23A and the second scavenging port 23B. In this case, the opening area of the first scavenging port 23A and the second scavenging port 23B can be secured, so that the deterioration in scavenging performance of the opposed-piston engine 1 can be suppressed. By suppressing the deterioration in scavenging performance of the opposed-piston engine 1, it is possible to suppress the increase of unburned loss and the occurrence of smoke in the opposed-piston engine 1.

(Exhaust Port)

Figure 10:
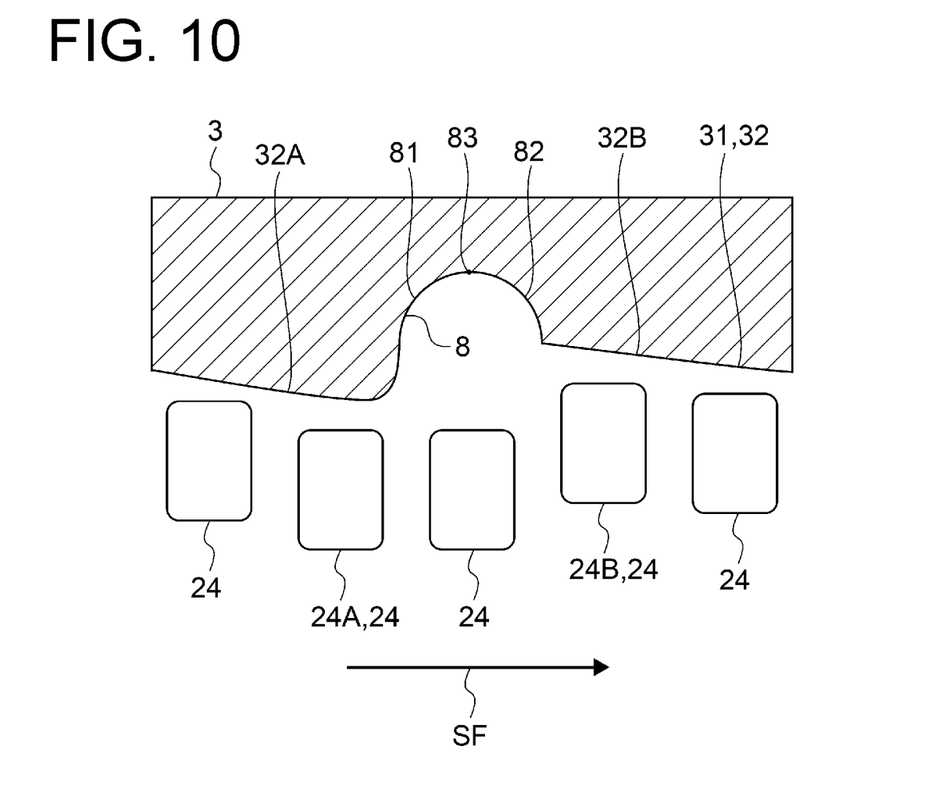
FIG. 10 is an explanatory diagram for describing an exhaust port according to an embodiment of the present disclosure.

FIG. 10 is an explanatory diagram for describing an exhaust port according to an embodiment of the present disclosure. FIG. 10 shows the one-side piston 3 at bottom dead center.

In some embodiments, as shown in FIG. 6, the groove height H1 of the upstream wall 81 of the one-side fuel injection groove 8 is higher than the groove height H2 of the downstream wall 82. As shown in FIG. 10, the inner surface 22 of the cylinder 2 has a first exhaust port 24A formed upstream of the one-side fuel injection groove 8 in the flow direction of the swirl flow SF, and a second exhaust port 24B formed downstream of the one-side fuel injection groove 8 in the flow direction of the swirl flow SF. The first exhaust port 24A is located on the other side (the side where the other-side piston 4 is located) in the axial direction with respect to the second exhaust port 24B. The first exhaust port 24A is the exhaust port 24 closest to the one-side fuel injection groove 8 of the exhaust ports 24 formed upstream of the one-side fuel injection groove 8. The second exhaust port 24B is the exhaust port 24 closest to the one-side fuel injection groove 8 of the exhaust ports 24 formed downstream of the one-side fuel injection groove 8. Each of the exhaust ports 24 is formed at a position offset from at least one of the other exhaust ports 24 in the axial direction of the cylinder 2 so as not to overlap the one-side piston 3 at bottom dead center.

According to the above configuration, the groove height H1 of the upstream wall 81 of the one-side fuel injection groove 8 is higher than the groove height H2 of the downstream wall 82. By forming the first exhaust port 24A, which is formed upstream of the one-side fuel injection groove 8, on the other side in the axial direction with respect to the second exhaust port 24B, which is formed downstream of the one-side fuel injection groove 8, when exhausting the combustion gas, the outer peripheral portion of the exhaust-side piston (one-side piston 3) does not overlap the first exhaust port 24A and the second exhaust port 24B. In this case, the opening area of the first exhaust port 24A and the second exhaust port 24B can be secured, so that the deterioration in exhaust performance of the opposed-piston engine 1 can be suppressed. By suppressing the deterioration in exhaust performance of the opposed-piston engine 1, it is possible to suppress the increase of unburned loss and the occurrence of smoke in the opposed-piston engine 1.

The present disclosure is not limited to the embodiments described above, but includes modifications to the embodiments described above, and embodiments composed of combinations of those embodiments.

The contents described in the above embodiments would be understood as follows, for instance.

1) An opposed-piston engine (1) according to at least one embodiment of the present disclosure includes: a cylinder (2); a one-side piston (3) disposed inside the cylinder (2) on one side in an axial direction; and an other-side piston (4) disposed inside the cylinder (2) on another side in the axial direction. A top surface (31) of the one-side piston (3) has a one-side cavity (6) recessed in a central portion. A top surface (41) of the other-side piston (4) has an other-side cavity (7) recessed in a central portion. An outer peripheral edge (61) of the one-side cavity (6) is at least 0.1D1 away from an outer peripheral edge (34) of the top surface (31) of the one-side piston (3) over the entire circumference, where D1 is a diameter of the top surface (31) of the one-side piston (3). An outer peripheral edge (71) of the other-side cavity (7) is at least 0.1D2 away from an outer peripheral edge (44) of the top surface (41) of the other-side piston (4) over the entire circumference, where D2 is a diameter of the top surface (41) of the other-side piston (4).

According to the above configuration 1), the outer peripheral edge (61) of the one-side cavity (6) is at least a predetermined distance away from the outer peripheral edge (34) of the top surface (31) of the one-side piston (3) over the entire circumference, and the outer peripheral edge (71) of the other-side cavity (7) is at least a predetermined distance away from the outer peripheral edge (44) of the top surface (41) of the other-side piston (4) over the entire circumference. Accordingly, a combustion space (11A) is formed at the center of the combustion chamber (11) by the one-side cavity (6) and the other-side cavity (7). Combustion can be completed in the combustion space (11A) by compressing the combustion gas in the combustion space (11A) and injecting fuel into the combustion space (11A). As a result, the combustion flame is suppressed from reaching the outer peripheral portions (33, 43) of the one-side piston (3) and the other-side piston (4), thereby reducing the heat load on the outer peripheral portions (33, 43) of the one-side piston (3) and the other-side piston (4).

2) In some embodiments, in the opposed-piston engine (1) described in the above 1), the one-side piston (3) has a one-side fuel injection groove (8) extending from the outer peripheral edge (61) of the one-side cavity (6) to the outer peripheral edge (34) of the top surface (31) of the one-side piston (3). The one-side fuel injection groove (8) has a higher groove height (H1) on an upstream side (upstream wall 81) in a flow direction of a swirl flow (SF) formed inside the cylinder (2) than a groove height (H2) on a downstream side (downstream wall 82) in the flow direction of the swirl flow (SF).

According to the above configuration 2), since the groove height (H1) on the upstream side (upstream wall 81) of the one-side fuel injection groove (8) is higher than the groove height (H2) on the downstream side (downstream wall 82), the swirl flow (SF) can be deflected to avoid entering the one-side fuel injection groove (8). By deflecting the swirl flow (SF), the swirl flow (SF) is prevented from interfering with the fuel passing through the one-side fuel injection groove (8), so that the fuel passing through the one-side fuel injection groove (8) is prevented from flowing along the swirl flow (SF) and adhering to the wall surface of the one-side piston (3). Thus, the fuel can be supplied to the combustion space (11A) without adhering to the wall surface of the one-side piston (3), thereby suppressing the increase of unburned loss in the opposed-piston engine (1).

3) In some embodiments, in the opposed-piston engine (1) described in the above 2), the other-side piston (4) has an other-side fuel injection groove (9) extending from the outer peripheral edge (71) of the other-side cavity (7) to the outer peripheral edge (44) of the top surface (41) of the other-side piston (4). The other-side fuel injection groove (9) has a higher groove height (H5) on an upstream side (upstream wall 91) in the flow direction of the swirl flow (SF) than a groove height (H6) on a downstream side (downstream wall 92) in the flow direction of the swirl flow (SF).

According to the above configuration 3), since the groove height (H5) on the upstream side (upstream wall 91) of the other-side fuel injection groove (9) is higher than the groove height (H6) on the downstream side (downstream wall 92), the swirl flow (SF) can be deflected to avoid entering the one-side fuel injection groove (9). By deflecting the swirl flow (SF), the swirl flow (SF) is prevented from interfering with the fuel passing through the other-side fuel injection groove (9), so that the fuel passing through the other-side fuel injection groove (9) is prevented from flowing along the swirl flow (SF) and adhering to the wall surface of the other-side piston (4). Thus, the fuel can be supplied to the combustion space (11A) without adhering to the wall surface of the other-side piston (4), thereby suppressing the increase of unburned loss in the opposed-piston engine (1).

4) In some embodiments, in the opposed-piston engine (1) described in the above 3), the one-side fuel injection groove (8) is offset from the other-side fuel injection groove (9) in a circumferential direction so that the one-side fuel injection groove (8) and the other-side fuel injection groove (9) face each other across an axis (25) of the cylinder (2).

According to the above configuration 4), the one-side fuel injection groove (8) is offset from the other-side fuel injection groove (9) in the circumferential direction so that they face each other across the axis (25) of the cylinder (2). In this case, the swirl flow (SF) deflected in the other-side fuel injection groove (9) can be prevented from entering the one-side fuel injection groove (8), and the swirl flow (SF) deflected in the one-side fuel injection groove (8) can be prevented from entering the other-side fuel injection groove (9). Thus, the fuel can be supplied to the combustion space (11A) without adhering to the wall surface of the one-side piston (3) or the other-side piston (4), thereby suppressing the increase of unburned loss in the opposed-piston engine (1).

5) In some embodiments, the opposed-piston engine (1) described in the above 4) further includes at least one fuel injection device (5) configured to inject fuel between the one-side piston (3) and the other-side piston (4) inside the cylinder (2). The at least one fuel injection device (5) includes a one-side fuel injection device (5A) disposed so that injected fuel passes through the one-side fuel injection groove (8), and an other-side fuel injection device (5B) disposed so that injected fuel passes through the other-side fuel injection groove (9).

According to the above configuration 5), the fuel injected by the one-side fuel injection device (5A) passes through the one-side fuel injection groove (8) and is supplied to the combustion space (11A). Further, the fuel injected by the other-side fuel injection device (5B) passes through the other-side fuel injection groove (9) and is supplied to the combustion space (11A). Since the fuel to be supplied to the combustion space (11A) passes through the one-side fuel injection groove (8) and the other-side fuel injection groove (9), the interference of the swirl flow (SF) can be suppressed. Further, by providing multiple supply systems for supplying fuel to the combustion space (11A), combustion in the combustion space (11A) can be promoted, thereby suppressing the increase of unburned loss in the opposed-piston engine (1).

6) In some embodiments, in the opposed-piston engine (1) described in the above a central axis (CA1) of the one-side fuel injection device (5A) is inclined to the one side in the axial direction from an outer side toward an inner side in a radial direction of the cylinder (2). A central axis (CA2) of the other-side fuel injection device (5B) is inclined to the other side in the axial direction from the outer side toward the inner side in the radial direction of the cylinder (2).

According to the above configuration 6), the fuel injected from the one-side fuel injection device (5A) flows to the one side in the axial direction along the extension direction of the central axis (CA1) of the one-side fuel injection device (5A), i.e., to the bottom of the one-side fuel injection groove (8). As a result, in the one-side fuel injection groove (8), it is possible to effectively suppress the interference between the fuel injected from the one-side fuel injection device (5A) and the swirl flow (SF). Further, the fuel injected from the other-side fuel injection device (5B) flows to the other side in the axial direction along the extension direction of the central axis (CA2) of the other-side fuel injection device (5B), i.e., to the bottom of the other-side fuel injection groove (9). As a result, in the other-side fuel injection groove (9), it is possible to effectively suppress the interference between the fuel injected from the other-side fuel injection device (5B) and the swirl flow (SF). Thus, the fuel can be supplied to the combustion space (11A) without adhering to the wall surface of the one-side piston (3) or the other-side piston (4), thereby suppressing the increase of unburned loss in the opposed-piston engine (1).

7) In some embodiments, in the opposed-piston engine (1) described in any one of the above 2) to 6), an inner surface (22) of the cylinder (2) has a first scavenging port (23A) formed upstream of the one-side fuel injection groove (8) in the flow direction of the swirl flow (SF), and a second scavenging port (23B) formed downstream of the one-side fuel injection groove (8) in the flow direction of the swirl flow (SF). The first scavenging port (23A) is located on the other side in the axial direction with respect to the second scavenging port (23B).

According to the above configuration 7), the groove height (H1) on the upstream side (upstream wall 81) of the one-side fuel injection groove (8) is higher than the groove height (H2) on the downstream side (downstream wall 82). By forming the first scavenging port (23A), which is formed upstream of the one-side fuel injection groove (8), on the other side in the axial direction with respect to the second scavenging port (23B), which is formed downstream of the one-side fuel injection groove (8), when scavenging the combustion gas, the outer peripheral portion of the scavenging-side piston (3A) does not overlap the first scavenging port (23A) and the second scavenging port (23B). In this case, the opening area of the first scavenging port (23A) and the second scavenging port (23A) can be secured, so that the deterioration in scavenging performance of the opposed-piston engine (1) can be suppressed. By suppressing the deterioration in scavenging performance of the opposed-piston engine (1), it is possible to suppress the increase of unburned loss and the occurrence of smoke in the opposed-piston engine (1).

8) In some embodiments, in the opposed-piston engine (1) described in any one of the above 2) to 6), an inner surface (22) of the cylinder (2) has a first exhaust port (24A) formed upstream of the one-side fuel injection groove (8) in the flow direction of the swirl flow (SF), and a second exhaust port (24B) formed downstream of the one-side fuel injection groove (8) in the flow direction of the swirl flow. The first exhaust port (24A) is located on the other side in the axial direction with respect to the second exhaust port (24B).

According to the above configuration 8), the groove height (H1) on the upstream side (upstream wall 81) of the one-side fuel injection groove (8) is higher than the groove height (H2) on the downstream side (downstream wall 82). By forming the first exhaust port (24A), which is formed upstream of the one-side fuel injection groove (8), on the other side in the axial direction with respect to the second exhaust port (24B), which is formed downstream of the one-side fuel injection groove (8), when exhausting the combustion gas, the outer peripheral portion of the exhaust-side piston (one-side piston 3) does not overlap the first exhaust port (24A) and the second exhaust port (24B). In this case, the opening area of the first exhaust port (24A) and the second exhaust port (24B) can be secured, so that the deterioration in exhaust performance of the opposed-piston engine (1) can be suppressed. By suppressing the deterioration in exhaust performance of the opposed-piston engine (1), it is possible to suppress the increase of unburned loss and the occurrence of smoke in the opposed-piston engine (1).

9) In some embodiments, in the opposed-piston engine (1) described in any one of the above 1) to 8), the one-side cavity (6) and the other-side cavity (7) are hemispherical.

According to the above configuration 6), when the one-side cavity (6) and the other-side cavity (7) are hemispherical, while securing the volume of the spherical combustion space (11A) formed at the center of the combustion chamber (11), the distances (D3, D4) of the outer peripheral edges (61, 71) of the one-side cavity (6) and the other-side cavity (7) from the outer peripheral edges (34, 44) of the top surface of the one-side piston (3) and the other-side piston (4) can be increased. By increasing the distances (D3, D4), the heat load on the outer peripheral portions (33, 43) of the one-side piston (3) and the other-side piston (4) can be reduced effectively.

REFERENCE SIGNS LIST

1 Opposed-piston engine
2 Cylinder
3 One-side piston
3A Scavenging-side piston
4 Other-side piston
4A Exhaust-side piston
5 Fuel injection device
5A One-side fuel injection device
5B Other-side fuel injection device
6 One-side cavity
7 Other-side cavity
8 One-side fuel injection groove
9 Other-side fuel injection groove
11 Combustion chamber
12 One-side piston pin
13 Other-side piston pin
14 One-side connecting rod
15 Other-side connecting rod
16 Crankshaft
17 Rotational shaft
21 Cylinder bore
22 Inner surface
23 Scavenging port
24 Exhaust port
25 Axis
31, 41 Top surface
32, 42 Outer peripheral edge portion
33, 43 Outer peripheral portion
34, 44 Outer peripheral edge
36 One-side groove portion
46 Other-side groove portion
51, 51A, 51B Injection hole
61, 71 Outer peripheral edge
62, 72 Concave curved surface
CA1, CA2 Central axis
CG Combustion gas
EG Exhaust gas
F Fuel
SF Swirl flow

The invention claimed is:

1. An opposed-piston engine, comprising:
a cylinder;
a one-side piston disposed inside the cylinder on one side in an axial direction; and
an other-side piston disposed inside the cylinder on another side in the axial direction,
wherein a top surface of the one-side piston has a one-side cavity recessed in a central portion,
wherein a top surface of the other-side piston has an other-side cavity recessed in a central portion,
wherein an outer peripheral edge of the one-side cavity is at least 0.1D1 away from an outer peripheral edge of the top surface of the one-side piston over the entire circumference,
where D1 is a diameter of the top surface of the one-side piston,
wherein an outer peripheral edge of the other-side cavity is at least 0.1D2 away from an outer peripheral edge of the top surface of the other-side piston over the entire circumference, where D2 is a diameter of the top surface of the other-side piston, wherein the one-side piston has a one-side fuel injection groove extending from the outer peripheral edge of the one-side cavity to the outer peripheral edge of the top surface of the one-side piston, and wherein the one-side fuel injection groove has a higher groove height on an upstream side in a flow direction of a swirl flow formed inside the cylinder than on a downstream side in the flow direction of the swirl flow.

2. The opposed-piston engine according to claim 1,
wherein the other-side piston has an other-side fuel injection groove extending from the outer peripheral edge of the other-side cavity to the outer peripheral edge of the top surface of the other-side piston, and wherein the other-side fuel injection groove has a higher groove height on an upstream side in the flow direction of the swirl flow than on a downstream side in the flow direction of the swirl flow.

3. The opposed-piston engine according to claim 2,
wherein the one-side fuel injection groove is offset from the other-side fuel injection groove in a circumferential direction so that the one-side fuel injection groove and the other-side fuel injection groove face each other across an axis of the cylinder.

4. The opposed-piston engine according to claim 3, further comprising at least one fuel injection device configured to inject fuel between the one-side piston and the other-side piston inside the cylinder,
wherein the at least one fuel injection device includes:
a one-side fuel injection device disposed so that injected fuel passes through the one-side fuel injection groove; and
an other-side fuel injection device disposed so that injected fuel passes through the other-side fuel injection groove.

5. The opposed-piston engine according to claim 4,
wherein a central axis of the one-side fuel injection device is inclined to the one side in the axial direction from an outer side toward an inner side in a radial direction of the cylinder, and wherein a central axis of the other-side fuel injection device is inclined to the other side in the axial direction from the outer side toward the inner side in the radial direction of the cylinder.

6. The opposed-piston engine according to claim 1,
wherein an inner surface of the cylinder has a first scavenging port formed upstream of the one-side fuel injection groove in the flow direction of the swirl flow, and a second scavenging port formed downstream of the one-side fuel injection groove in the flow direction of the swirl flow, and wherein the first scavenging port is located on the other side in the axial direction with respect to the second scavenging port.

7. The opposed-piston engine according to claim 1,
wherein an inner surface of the cylinder has a first exhaust port formed upstream of the one-side fuel injection groove in the flow direction of the swirl flow, and a second exhaust port formed downstream of the one-side fuel injection groove in the flow direction of the swirl flow, and wherein the first exhaust port is located on the other side in the axial direction with respect to the second exhaust port.

8. The opposed-piston engine according to claim 1,
wherein the one-side cavity and the other-side cavity are hemispherical.

* * * * *